US009215646B2

(12) United States Patent
Lee et al.

(10) Patent No.: US 9,215,646 B2
(45) Date of Patent: Dec. 15, 2015

(54) METHOD AND DEVICE FOR TRANSMITTING/RECEIVING DATA IN WIRELESS ACCESS SYSTEM SUPPORTING MULTI-RADIO ACCESS TECHNOLOGY

(75) Inventors: Eunjong Lee, Anyang-si (KR); Heejeong Cho, Anyang-si (KR); Youngsoo Yuk, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 19 days.

(21) Appl. No.: 13/811,653

(22) PCT Filed: Jul. 22, 2011

(86) PCT No.: PCT/KR2011/005449
§ 371 (c)(1),
(2), (4) Date: Jan. 22, 2013

(87) PCT Pub. No.: WO2012/011789
PCT Pub. Date: Jan. 26, 2012

(65) Prior Publication Data
US 2013/0165114 A1    Jun. 27, 2013

Related U.S. Application Data

(60) Provisional application No. 61/366,896, filed on Jul. 22, 2010, provisional application No. 61/368,240, filed on Jul. 27, 2010.

(51) Int. Cl.
*H04W 48/18* (2009.01)
*H04W 48/10* (2009.01)
(Continued)

(52) U.S. Cl.
CPC ............ *H04W 48/10* (2013.01); *H04W 76/025* (2013.01); *H04W 48/18* (2013.01); *H04W 76/026* (2013.01); *H04W 88/06* (2013.01)

(58) Field of Classification Search
CPC ...... H04W 48/18; H04W 36/00; H04W 48/10
USPC ........ 455/436–444, 435.2, 434; 370/331, 332
See application file for complete search history.

(56) References Cited

U.S. PATENT DOCUMENTS 8,291,625 B2 * 10/2012 Lee et al. .................... 37/331
8,457,070 B2 *  6/2013 Park et al. ......... H04W 36/0066
                                                          370/331
(Continued)

OTHER PUBLICATIONS

Kim, et al., "Contribution for Hierarchical Network Study Report", IEEE 802.16 Broadband Wireless Access Working Group, IEEE C802.16ppc-10/0044, Jul. 2010, 9 pages.

(Continued)

*Primary Examiner* — Sharad Rampuria
*Assistant Examiner* — Farideh Madani
(74) *Attorney, Agent, or Firm* — Lee, Hong, Degerman, Kang & Waimey

(57) ABSTRACT

The present invention relates to a method by which a terminal transmits/receives data to/from a first base station supporting a first wireless access technology and a second base station supporting a second wireless access technology in a wireless access system supporting multi-radio access technology (multi-RAT), the method comprising: a step for executing an initial network entry process with the first base station; a step for executing a multi-RAT capability negotiation process with the first base station to exchange information needed to access the second base station; a step for executing a scanning process on at least one second base station included in the coverage of the first base station, based on the information received from the first base station through the multi-RAT capability negotiation process; a step for executing an access process with one of the second base stations from said at least one second base station; and a step for simultaneously transmitting/receiving data with the first base station and the second base station accessed through the access process, wherein the step for executing the access process includes: a step for receiving a second system access command message that commands access to the one of the second base stations from the first base station; and a step for accessing the one of the second base stations based on the second system access command message received.

10 Claims, 7 Drawing Sheets

(51) Int. Cl.
*H04W 76/02* (2009.01)
*H04W 88/06* (2009.01)

(56) References Cited

U.S. PATENT DOCUMENTS

| | | | |
|---|---|---|---|
| 2004/0087340 A1* | 5/2004 | Cao et al. | H04W 36/0094 455/560 |
| 2007/0115796 A1* | 5/2007 | Jeong et al. | H04L 1/0026 370/203 |
| 2009/0180451 A1 | 7/2009 | Alpert et al. | |
| 2010/0041405 A1* | 2/2010 | Gallagher et al. | 455/436 |
| 2010/0111214 A1 | 5/2010 | Chin et al. | |
| 2011/0014919 A1* | 1/2011 | Otte et al. | 455/442 |

OTHER PUBLICATIONS

Kim, et al., "Study Report on Hierarchical Networks (Working document)", IEEE 802.16 Broadband Wireless Access Working Group, IEEE 802.16ppc-10/0008, Jul. 2010, 15 pages (relevant sections: 2.2 and 3).

PCT International Application No. PCT/KR2011/005449, Written Opinion of the International Searching Authority dated Feb. 6, 2012, 14 pages.

* cited by examiner

METHOD AND DEVICE FOR TRANSMITTING/RECEIVING DATA IN WIRELESS ACCESS SYSTEM SUPPORTING MULTI-RADIO ACCESS TECHNOLOGY

CROSS-REFERENCE TO RELATED APPLICATIONS

This application is the National Stage filing under 35 U.S.C. 371 of International Application No. PCT/KR2011/005449, filed on Jul. 22, 2011, which claims the benefit of U.S. Provisional Application Ser. No. 61/366,896, filed on Jul. 22, 2010, and U.S. Provisional Application Ser. No. 61/368,240, filed on Jul. 27, 2010, the contents of which are all hereby incorporated by reference herein in their entirety.

TECHNICAL FIELD

The present specification relates to a wireless access system supporting a multi-radio access technology (RAT), and more particularly, to a method of transceiving data via two or more heterogeneous networks and apparatus therefor.

BACKGROUND ART

In a conventional wireless communication system supporting two or more heterogeneous networks, although a mobile station has a capability of accessing a multi-radio access technology (RAT), the mobile station is not able to simultaneously transceive data with the two or more heterogeneous network by accessing the multi radio access technology at the same time.

In particular, in case of a mobile station supporting a conventional multi-radio access technology, the mobile station becomes available to transceive data via a single network in a manner of accessing a prescribed radio access technology based on a switching. Hence, a mobile station capable of accessing a multi-RAT transceives data via a specific network. In case that the mobile station tranceives data with a network different from the specific network, data transmission/reception to/from one of the networks becomes suspended.

Therefore, although a mobile station capable of supporting two or more heterogeneous networks is able to perform a communication using networks different from each other in a related art, there exists a limit in terms of efficiency since it simply operates based on a switching.

Moreover, since the networks different from each other perform independent operations, respectively, inefficient management is performed in aspect of managing overall flow of a mobile station.

DISCLOSURE OF THE INVENTION

Technical Tasks

An object of the present specification is to define an overall process for a mobile station having a multi-RAT capability to simultaneously transmit/receive data via two or more heterogeneous networks, i.e., each of networks.

Another object of the present specification is to define a multi-RAT capability negotiation process between a mobile station having a multi-RAT capability and a base station indicating an overall control operation to simultaneously transmit/receive data via two or more networks.

Another object of the present specification is to define a scan performing procedure for a second system of a multi-RAT mobile station including a process of transmitting a scanning information on a nearby second system of the multi-RAT mobile station to a base station.

A further object of the present specification is to define an overall operation for a management procedure of a second system in order for a multi-RAT mobile station to add, delete, and change the second system while a first system is accessed by the multi-RAT mobile station.

Technical Solution

To achieve these and other advantages and in accordance with the purpose of the present invention, as embodied and broadly described, a method of transceiving data by a mobile station with a first base station supporting a first radio access technology and a second base station supporting a second radio access technology in a radio access system supporting a multi-radio access technology (RAT) includes the steps of performing an initial network entry process with the first base station, performing an multi-RAT capability negotiation process with the first base station to exchange information necessary for an access to the second base station, performing a scanning procedure on at least one second base station included in a coverage of the first base station based on the information received from the first base station by the multi-RAT capability negotiation process, performing an access procedure with a specific base station of the at least one second base station, and transceiving the data simultaneously with the first base station and the specific base station accessed by the access procedure, wherein the performing the access procedure includes the steps of receiving a second system access command message indicating the access to the specific base station of the at least one second base station from the first base station and accessing the specific base station based on the received second system access command message.

Preferably, the performing the access procedure further includes the step of making a request for the access to the specific base station to the first base station.

Preferably, the performing the access procedure further includes the step of sending to the first base station a second system access indication message indicating whether the access to the specific base station is successful.

Preferably, the second system access command message includes at least one of information on the second base station accessed by the mobile station, flow information transmitted to the accessed second base station, and information indicating a scheme of authentication between the mobile station and the second base station.

Preferably, while data is transceived with the second base station, if a channel quality with the second base station is smaller than a pre-defined threshold value, the method further includes the step of making a request for a cancellation of connection with the second base station to the first base station.

More preferably, if transceiving data with the accessed second base station is completed, the method further includes the step of canceling the connection with the second base station.

Preferably, the first radio access technology is a wideband radio access technology and the second radio access technology is a short-range radio access technology.

More preferably, the wideband radio access technology is a radio access technology supporting 802.16 and the short-range radio access technology is a radio access technology supporting 802.11.

Preferably, the first base station and the second base station are connected with each other by wire or wirelessly.

Preferably, a type of data flow transceived via the second base station is determined by an indication of the first base station.

To further achieve these and other advantages and in accordance with the purpose of the present invention, a mobile station transceiving data with a first base station supporting a first radio access technology and a second base station supporting a second radio access technology in a radio access system supporting a multi-radio access technology (RAT) includes a wireless communication unit configured to externally transmit/receive a wireless signal with a external device and a control unit connected to the wireless communication unit controlling the wireless communication unit to perform an initial network entry process with the first base station, the control unit controlling the wireless communication unit to perform an multi-RAT capability negotiation process with the first base station to exchange information necessary for an access to the second base station, the control unit controlling the wireless communication unit to perform a scanning procedure for at least one second base station included in a coverage of the first base station based on the information received from the first base station via the multi-RAT capability negotiation process, the control unit controlling the wireless communication unit to receive a second system access command message indicating the access to a specific base station of the at least one second base station from the first base station, the control unit controlling the wireless communication unit to transceive data simultaneously with the first base station and the specific base station in a manner of accessing the specific base station based on the received second system access command message.

Advantageous Effects

According to the present specification, a multi-RAT mobile station is able to simultaneously transceive data with each of networks via two or more heterogeneous networks, thereby reducing an overhead resulted from a data transmission/reception in a specific network.

According to the present specification, a mobile station transmits that the mobile station has a multi-RAT capability to a base station via an initial network entry process, thereby enabling the base station to easily discriminate the corresponding mobile station having the multi-RAT capability.

According to the present specification, a multi-RAT capability negotiation process is performed between a multi-RAT mobile station and a base station of a first system, thereby enabling the first system to indicate the multi-RAT mobile station to efficiently use a second system appropriate for a capability of the multi-RAT mobile station.

According to the present specification, a multi-RAT mobile station performs a scan performing procedure for a second system of the multi-RAT mobile station including a process of transmitting a scanning information on a nearby second system of the multi-RAT mobile station to a base station, thereby enabling a first system managing the second system to efficiently configure an access of the multi-RAT mobile station to the second system.

According to the present specification, an overall operation for a management process of a second system is defined in order for a multi-RAT mobile station to add, delete, and change the second system while a first system is accessed by the multi-RAT mobile station, thereby enabling the multi-RAT mobile station to simultaneously transceive data with two or more heterogeneous networks.

BEST MODE

Mode for Invention

Figure 1A:
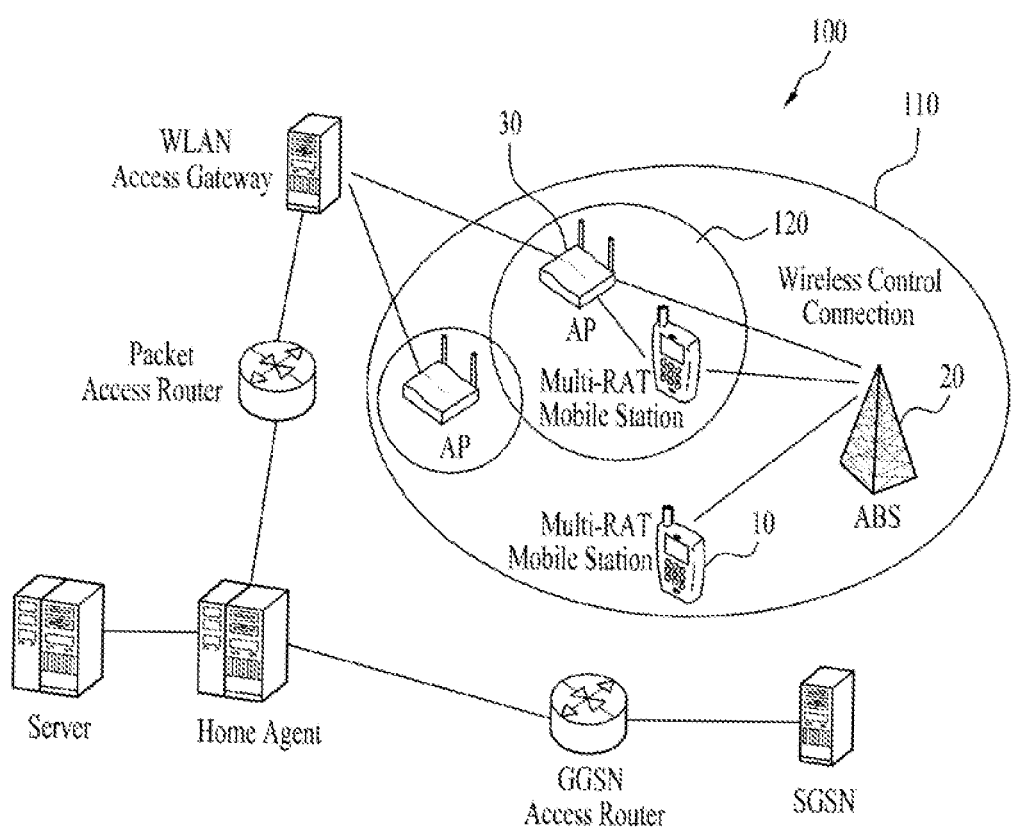
FIG. 1A and FIG. 1B are conceptual diagrams for explaining a multi-radio access technology (multi-RAT), to which one embodiment of the present specification can be applied.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like.

CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. IEEE 802.16m is an evolved version of IEEE 802.16e and may provide a backward compatibility to a system based on IEEE. 802.16e.

UTRA is a part of UMTS (Universal Mobile Telecommunications System).

3GPP ($3^{rd}$ Generation Partnership Project) LTE (long term evolution) is a part of E-UMTS (Evolved UMTS) that uses E-UTRA (Evolved-UMTS terrestrial radio access). The 3GPP LTE adopts OFDMA in downlink and SC-FDMA in uplink. And, LTE-A (LTE-Advanced) is an evolved version of 3GPP LTE.

In the following description, a preferable embodiment according to the present invention is explained in detail with reference to the attached drawings. The same reference numbers will be used throughout the drawings to refer to the same or like parts in this specification irrespective of the sign of the drawings and the overlapped explanation on the corresponding content can be omitted. And, in describing the present invention, if the detailed description of the related art is determined as making the point of the present invention unclear, it will be omitted. The accompanying drawings, which are included to provide a further understanding of the invention and are incorporated in and constitute a part of this specification, illustrate embodiments of the invention and together with the description serve to explain the principles of the invention only. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

In the following description, a method for a mobile station to simultaneously transceive data via each of networks in a manner of accessing two or more heterogeneous networks (or multi RATs) in a multi-RAT network proposed by the present specification is explained.

First of all, a multi radio access technology (RAT) network proposed by the present specification is explained.

Figure 1B:
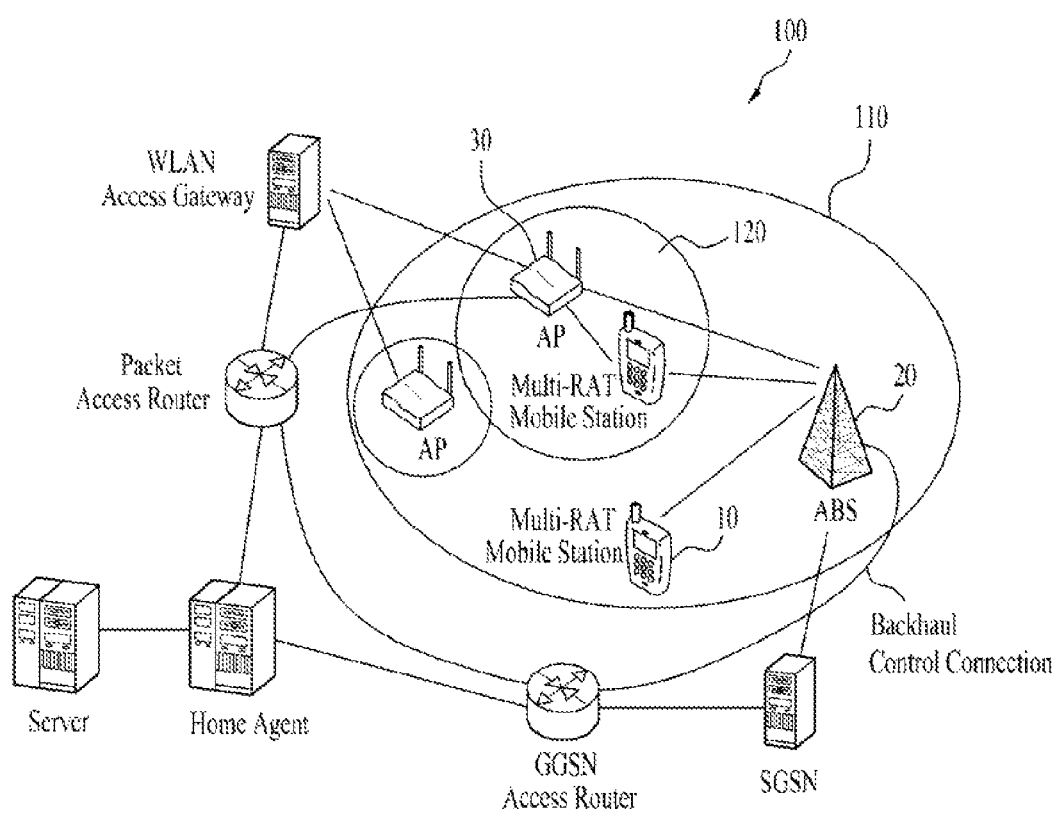

FIG. 1A and FIG. 1B are conceptual diagrams for explaining a multi-radio access technology (multi-RAT), to which one embodiment of the present specification can be applied.

The multi-radio access technology (hereinafter abbreviated multi-RAT) network may indicate a radio communication environment having two or more hetero generous networks and capable of performing a simultaneous communication in a manner of accessing the two or more heterogeneous networks by a mobile station.

In this case, the mobile station capable of performing a simultaneous communication with the two or more heterogeneous networks is called a multi-RAT mobile station or a multi system mobile station.

A heterogeneous network (or heterogeneous system) means a network that uses a communication scheme different from the communication scheme used by a specific network with reference to the specific network.

For instance, WiMAX network, which is one example for a mobile communication system, and WiFi network using WiFi network correspond to a heterogeneous network with each other.

A RAT is a type of technology used in a wireless access. For instance, the RAT may include GERAN (GSM/EDGE radio access network), UTRAN (UMTS terrestrial radio access network), E-UTRAN (evolved-UMTS), WiMAX, LTE (LTE-advanced), WiFi, etc. In particular, GERAN, UTRAN, E-UTRAN, WiMAX and/or WiFi exist in a manner of being mixed in a same region.

As shown in FIG. 1, a multi-RAT network 100 may be configured by including a first system (a primary system 110) and a second system (a second system 120).

In this case, the first system 110 and the second system 120 can be represented as a $1^{st}$ network and a $2^{nd}$ network, respectively. The first system 110 may include a multi-RAT mobile station 10, a base station 20, and the second system 120. The second system 120 may include a multi-RAT mobile station 10 and an AP 30.

The first system is a system having a wide range of coverage and may be a mobile communication system. For instance, the first system may be a WiMAX or a LTE (LTE-A) system. And, the first system is a system always having a status with the multi-RAT mobile station. In particular, the first system is a system that maintains an active state or a sleep/idle mode state with the multi-RAT mobile station.

The second system is a system having a small range of coverage and may be a short-range communication system (WLAN). For instance, the second system may be a WiFi system. In particular, the second system is a system that can be added or deleted to/from a multi-RAT network if necessary. And, the second system may be used mainly for transceiving data requiring a higher bandwidth. Hence, a specific flow (QoS) can be mapped for the use of the second system.

In this case, an access point, which is one example of the second system, may be able to operate equally to a mobile station capable of communicating with the first system.

And, the first system and the second system are connected to each other by wired or wireless in a multi-RAT network. In particular, a base station of the first system and a base station of the second system may be connected to each other by wired via a backbone network (FIG. 1B) or may be connected to each other by wireless (FIG. 1A).

In the following description, for clarity of explanation, assume that the first system is WiMAX system and the second system is WiFi system unless there is a specific mention. Therefore, it will be represented that a base station corresponding to the first system is a 'base station' and a base station corresponding to the second system is 'AP'. And, an access to the first system may correspond to the access to the base station and an access to the second system may correspond to the access to the AP.

Figure 2:
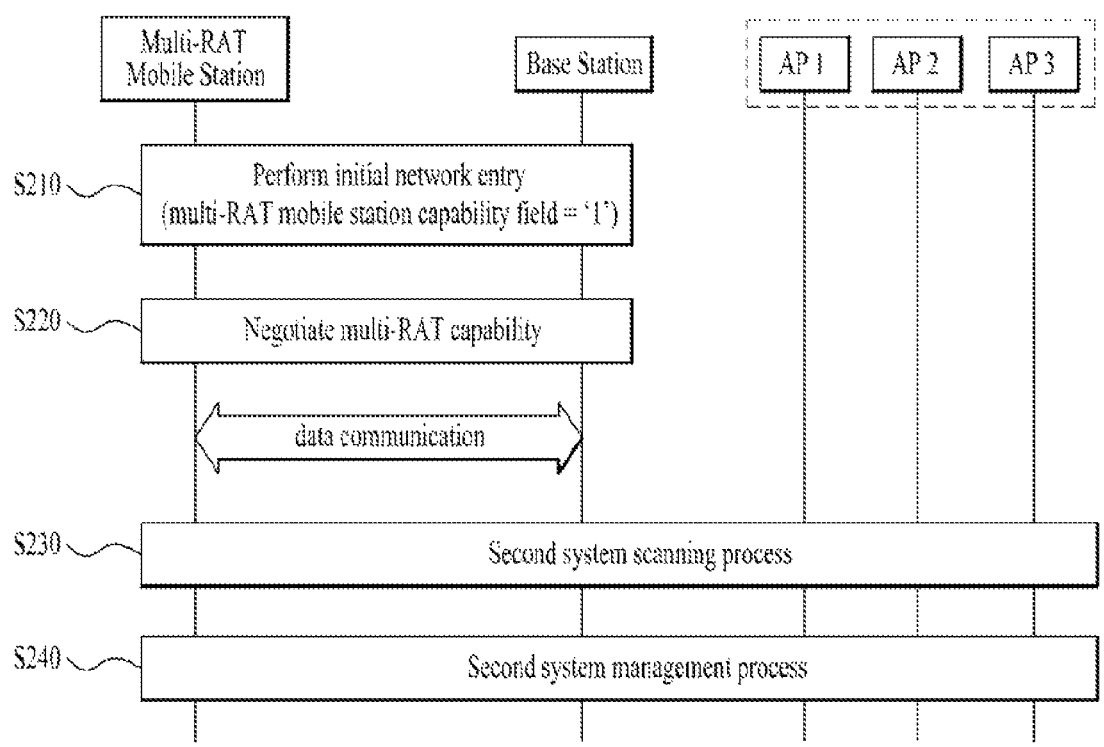
FIG. 2 is a flowchart for explaining a method for a multi-RAT mobile station to transceive data via a first system and a second system according to one embodiment of the present specification.

FIG. 2 is a flowchart for explaining a method for a multi-RAT mobile station to transceive data via a first system and a second system according to one embodiment of the present specification.

Referring to FIG. 2, the multi-RAT mobile station performs an initial network entry process with a base station (S210).

A multi-RAT mobile station transmits an indicator indicating that the multi-RAT mobile station is a mobile station supporting a multi-RAT to a base station via an initial entry process performed with the base station. In this case, the indicator may be a multi-RAT mobile station capability field. And, the indicator, i.e. the multi-RAT mobile station capability field, may be 1-bit long.

And, the indicator may be transmitted by a registration process performed with the base station during the initial network entry process. In this case, the indicator may be transmitted to the base station by a registration request or a registration response message (REG-REQ/RSP message).

For instance, if the indicator is set to '1', it indicates a mobile station supporting a multi-RAT. If the indicator is set to '0', it indicates a mobile station not supporting a multi-RAT.

And, if the base station receives a registration request or a registration response message including an indicator (e.g., set to '1') indicating that a multi-RAT mobile station has a capability of supporting a multi-RAT from the multi-RAT mobile station, the base station may transmit the multi-RAT mobile station an information informing that a separate multi-RAT capability negotiation process for supporting the multi-RAT mobile station will be performed after the completion of the initial network entry process or a prescribed time period.

For instance, if the information is set to '1', the base station and the multi-RAT mobile station indicate that a separate capability negotiation process is performed to support the multi-RAT, if the information is set to '0', the base station and the multi-RAT mobile station indicate that a separate capability negotiation process is not necessary to be performed.

In case that the multi-RAT mobile station finished the initial network entry process with the base station, the multi-RAT mobile station and the base station perform the multi-RAT capability negotiation process (S220). In this case, the multi-RAT capability negotiation process is performed after the completion of the network (re)entry process in general. Yet, it may also be performed in the middle of the network (re)entry process with the base station.

For instance, if the multi-RAT capability negotiation process is performed in the middle of the network (re)entry process, the multi-RAT mobile station and the base station may be able to perform the multi-RAT capability negotiation process via a registration procedure of the multi-RAT mobile station and the base station. In doing so, the multi-RAT mobile station and the base station transceive an information on the multi-RAT capability negotiation via a registration request/response (REG-REQ/REG-RSP) message.

The multi-RAT capability negotiation process between the multi-RAT mobile station and the first system shall be explained in detail with reference to FIG. 3 as follows.

Thereafter, the multi-RAT mobile station performs an AP scanning process to access the second system based on the second system related information received from the base station (S230).

In this case, the multi-RAT mobile station performs a scanning process for a nearby AP periodically or in a manner of event-triggered to access the second system.

First of all, assume that a connection for all data transmitted to the multi-RAT mobile station is established through a dynamic service procedure (DSx procedure) of the first system performed with the base station. Also, assume that a communication between the multi-RAT mobile station and the second system is to transmit data for a specific flow to the second system under the judgment of the base station of the first system.

And, assume a scanning of the multi-RAT mobile station for an AP of the second system is performed under an instruction of the base station of the first system. The reason for this is for a power saving of the multi-RAT mobile station.

The AP scanning process for the multi-RAT mobile station to access the second system may include the processes of receiving a multi-RAT scan command message from the base station, performing a scan based on the received multi-RAT scan command message, and sending the base station a multi-RAT scan report message to report a scanned result.

Figure 4:
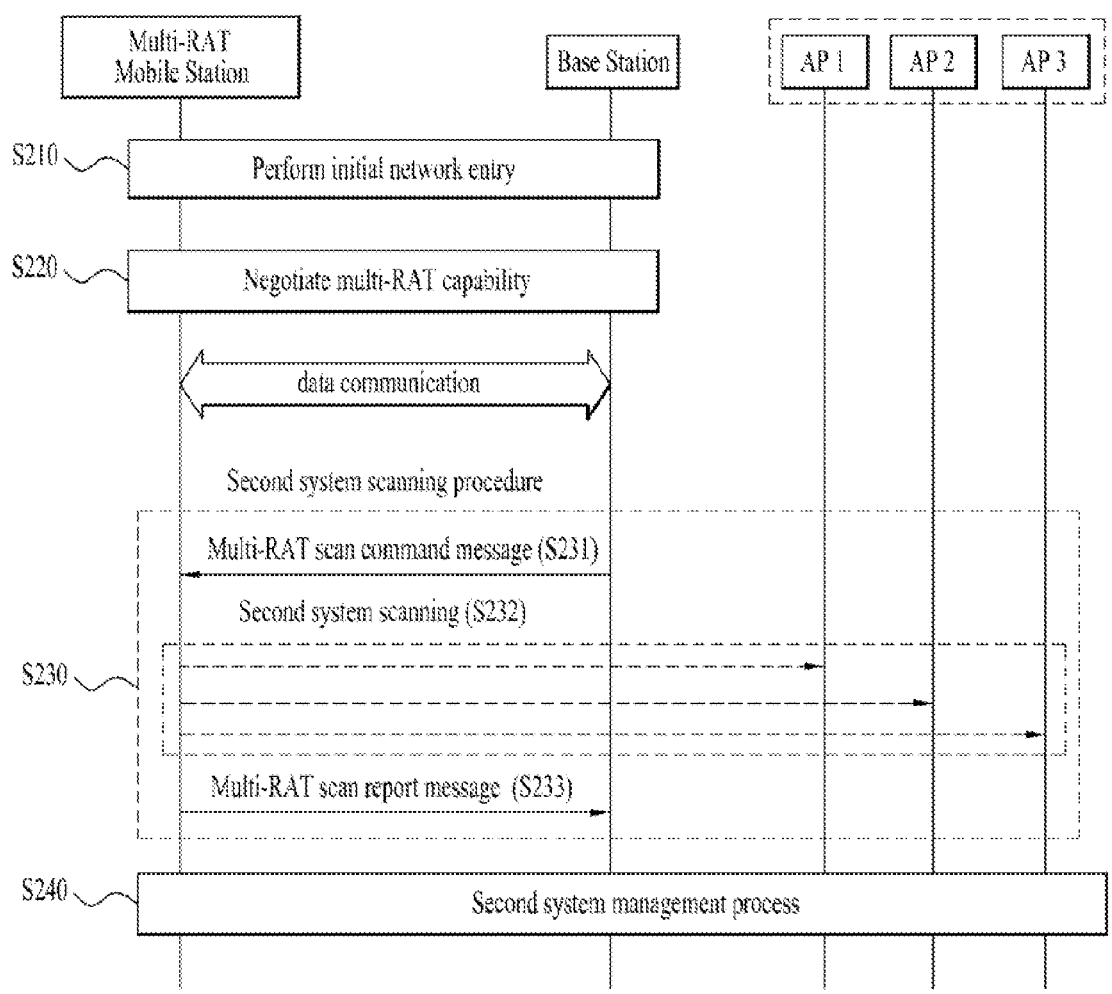
FIG. 4 is a flowchart for explaining a scanning procedure of a multi-RAT mobile station for a second system according to one embodiment of the present specification.

Referring to FIG. 4 described in the following description, a scanning process for the multi-RAT mobile station to access the second system is explained in detail.

First of all, the multi-RAT mobile station performs a management (or an operation) procedure with the second system (S240). In this case, the management procedure with the second system may indicate such a process as a connection with the second system, a cancellation of the connection with the second system, a connection change with the second system and the like of the multi-RAT mobile station. In this case, the management procedure of the second system is controlled by the first system.

After performing an access procedure with the second system, the multi-RAT mobile station transceives data via an AP of the second system.

In this case, in order for the multi-RAT mobile station to access the second system, the multi-RAT mobile station should receive a confirmation response for the access to the second system from the first system.

As mentioned in the foregoing description, the base station selects an AP for the multi-RAT mobile station to access before transmitting the multi-RAT mobile station the confirmation response for the access of the multi-RAT mobile station to the second system and then checks the status of the selected AP. Having checked the status of the AP, if it is feasible to access the selected AP, the base station may be able to transmit an information on the multi-RAT mobile station to the selected AP in advance.

And, in case that the base station transmits the confirmation response to the multi-RAT mobile station, necessary or useful information for the multi-RAT mobile station to access the AP may be transmitted together with the confirmation response.

For instance, the necessary or useful information may include a SSID, a protocol version of the AP (11a/b/n . . . ), offset information between beacon and a frame of the base station, i.e., transmitting a relative position of the beacon by representing the difference with a specific frame time, and the like.

Having performed the AP scanning for the access to the second system, if the multi-RAT mobile station recognizes that the multi-RAT mobile station entered a coverage of the second system, the multi-RAT mobile station may make a request for an access to the second system to the base station of the first system.

Messages necessary for the management process of the second system may include as follows.

1. second system request (SS_REQ) message
   : message used for the multi-RAT mobile station to make a request for an access to an AP.
2. second system command (SS_CMD) message
   : message used for managing the access with the AP, used for a connection with the AP, a cancellation of the connection with the AP, the connection change with the AP, and the like.
3. second system indication (SS_IND) message
   : message used in response to the second system command message, used for informing the base station of a success of connection with the AP, a success of a cancellation of the connection with the AP, a success of the connection change with the AP.

Thereafter, in case that the multi-RAT succeeded in accessing the AP of the second system, the multi-RAT mobile station may be able to simultaneously transceive data with the first system and the second system. In this case, the data transceived with the multi-RAT mobile station via the AP is controlled by the first system.

Multi-RAT Capability Negotiation Process

In the following description, a multi-RAT capability negotiation process between a multi-RAT mobile station and a base station is explained in detail.

Figure 3:
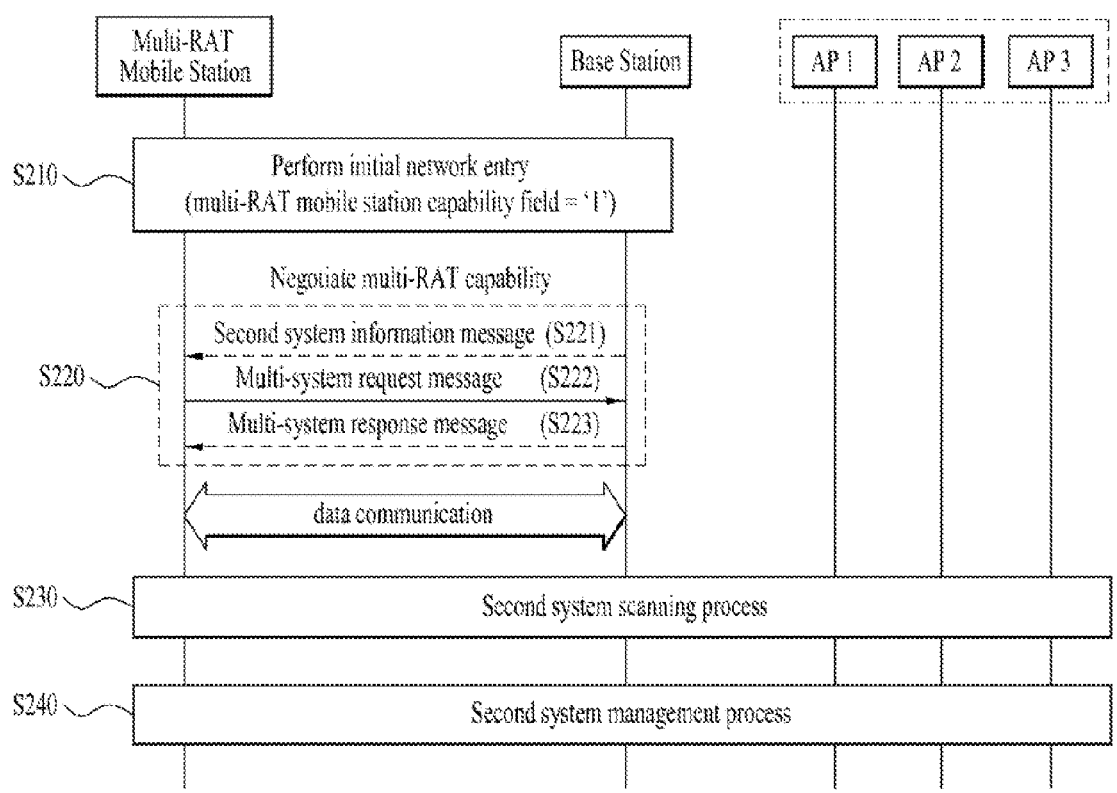
FIG. 3 is a flowchart for explaining a multi-RAT capability negotiation process between a multi-RAT mobile station and a first system according to one embodiment of the present specification.

FIG. 3 is a flowchart for explaining a multi-RAT capability negotiation process between a multi-RAT mobile station and a first system according to one embodiment of the present specification.

Since S210, S230 to S240 are the same as the contents of FIG. 2, the explanation for the steps are omitted. The step of S220 having a difference is explained in detail.

As mentioned in the above description, the multi-RAT capability negotiation process between a multi-RAT mobile station and a base station is performed after a network (re) entry.

In case of a network re-entry, the multi-RAT capability negotiation process can be omitted. Since the multi-RAT capability negotiation process has already been performed via an initial network entry process between the multi-RAT mobile station and the base station, performing a same procedure, which performed already, again when the multi-RAT mobile station performs a network re-entry into an identical system, it may occur an unnecessary overhead.

And, in case of a handover (HO), a target base station of the first system may be able to perform the multi-RAT capability negotiation process with the multi-RAT mobile station in advance from a serving base station of the first system via a backbone network.

The multi-RAT capability negotiation process performed by the multi-RAT mobile station with the first system as follows.

First of all, the base station may be able to transmit the second system related information to the multi-RAT mobile station (S221). In particular, if there exist a common information on APs of the second system of which the multi-RAT mobile station should receive, the base station may be able to transmit the information on APs to the multi-RAT mobile station in a manner of broadcast or unicast.

In this case, the second system related information may mean an information on a heterogeneous system, which belongs to a same coverage with the first system. The multi-RAT mobile station may not necessarily know the information on all of the second systems included in the first system and the second system related information. In this case, the base station does not transmit the information on all of the second systems and the second system related information and may be then able to transmit a list of information related (or necessary) to the multi-RAT mobile station only to the multi-RAT mobile station in a manner of unicast. In doing so, the list may be transmitted in the middle of the multi-RAT capability negotiation process.

Thereafter, the multi-RAT mobile station sends a multisystem capability request message to the base station (S222). The multisystem capability request message may include 802.11 MAC address of a mobile station, an information on a previously accessed AP, a protocol version information of 802.11 and the like. The 802.11 MAC address is necessary for an authentication information. In case that the previously accessed AP information is included in the multisystem capability request message, the multisystem capability request message is transmitted to the base station to which the previously accessed AP belongs only.

Thereafter, the base station sends a multisystem capability response message to the multi-RAT mobile station in response to the multisystem capability request message (S223).

The multisystem capability response message may include an information on candidate APs.

In case that the multi-RAT mobile station entered an idle mode, the base station may be able to store the information obtained via the multi-RAT capability negotiation process with the multi-RAT mobile station for a prescribed time. In particular, the base station stores the obtained information until the base station newly defines a multi-RAT information maintenance timer and the multi-RAT information maintenance timer is expired. The base station may be able to discard the obtained information after the timer is expired.

Therefore, in case that the multi-RAT mobile station performs a network re-entry to the base station before the multi-RAT information maintenance timer is expired, the multi-RAT capability negotiation process may be omitted.

Second System Scanning Process

In the following description, a scanning process for a second system performed by a multi-RAT mobile station is explained in detail.

FIG. 4 is a flowchart for explaining a scanning process of a multi-RAT mobile station for a second system according to one embodiment of the present specification.

Since S210 to S220 and S240 are the same as the contents of FIG. 2, the explanation for the steps is omitted. The step of S230 having a difference is explained in detail.

First of all, when a base station determines that a specific data flow needs WiFi to communicate, the base station instructs a multi-RAT mobile station to perform a scan for a nearby AP.

In particular, the base station sends a multi-RAT scan command message (multi RAT_SCN-CMD message) to the multi-RAT mobile station (S231). In this case, the multi-RAT scan command message may include a SSID of the nearby AP, a beacon transmission interval, an information on scanning interval in order for the multi-RAT mobile station to quickly detect the nearby AP.

In this case, the multi-RAT mobile station may be able to directly make a request for a scanning for an access to the second system to the base station of the first system without being indicated by the base station as mentioned in the above. In doing so, the multi-RAT mobile station and the base station may be able to perform a scan for the nearby AP via a probe request/response transceiving process.

In this case, the multi-RAT mobile station performs a scan for the access to the second system while transceiving data with the base station of the first system. In this case, the multi-RAT mobile station may be able to indicate only a SCN-REP transmission scheme via a SCN-CMD message without a configuration of a scanning interval with the base station.

In particular, in case that the multi-RAT mobile station received the multi-RAT scan command message from the base station, the multi-RAT mobile station performs a scan for the nearby AP of the multi-RAT mobile station based on the information included in the received multi-RAT scan command message (S232). In this case, the nearby AP of the multi-RAT mobile station may be APs of the second system within the coverage of the base station of the first system.

Thereafter, the multi-RAT mobile station sends a multi-RAT scan report message (multi RAT_SCN-REP message) to the base station of the first system (S233). In particular, the multi-RAT mobile station transmits a scanned result for a detected AP to the base station. In this case, the multi-RAT mobile station may be able to transmit a received signal strength indication (RSSI) for each of the APs or a preferred AP information of the multi-RAT mobile station together with the scanned result.

For instance, in case that a scan report mode of the multi RAT scan command message, which is received lately from the base station, is set to '0b10', the multi-RAT mobile station may be able to send the multi-RAT scan report message to the base station in a manner of event-triggered.

In this case, if a condition of the scan report trigger is satisfied, the multi-RAT mobile station transmits the multi-RAT scan report message to the base station.

For another instance, for a periodical scan report (for instance, in case that a report mode is set to '0b01') or one time scan report (for instance, in case that the report mode is set to '0b11'), the multi-RAT mobile station may be able to report a scanned result to the base station on a timing specified in the multi-RAT scan command message except the timing of the scanning interval.

And, in case that the multi-RAT mobile station periodically performs a scan report to the base station, the multi-RAT mobile station may be able to stop reporting a scanned result for an AP after all scanning intervals in the multi-RAT scan command message.

And, the multi-RAT scan report message includes all available scanned results for the requested APs, which are specified in the multi-RAT scan command message.

The multi-RAT mobile station may be able to send the multi-RAT scan report message to the base station to report the scanned result to the base station at any time or to receive a system information for a requested system and a multi-RAT neighbor advertisement message having a system information for the different RATs, which are selectively determined to be located near the multi-RAT mobile station by the base station, from the base station in a manner of unicast.

Moreover, by including a neighbor requested RAT type indicator and/or SSIDs (or a BSSID/a MAC address) in the scan report message, the multi-RAT mobile station may be able to instruct the base station to filter a neighbor second system list based on the requested radio type.

Thereafter, in case that the base station received the scanned results for a plurality of APs from the multi-RAT mobile station, i.e., in case that the base station received the multi-RAT scan report message, the base station may be able to inform the multi-RAT mobile station of an optimized system, i.e., an AP in consideration of an identical operator, a priority of a mobile station, a channel quality, a load balancing, a transmitted traffic, or the like.

As a different embodiment, in order to perform a scanning process for a second system, the multi-RAT mobile station may be able to use an existing transceived message instead of the above defined multi-RAT scan command/report message. In case that the multi-RAT mobile station performs a scan for the second system using the existing message, the existing message includes an information for indicating that the scan performed by the multi-RAT mobile station is to transceive data using a multi-RAT system. In particular, by newly defining a field capable of indicating a SSID, a BSSID, or an MAC address of a target system, a scanning object of the multi-RAT mobile station can be indicated.

Thereafter, having performed an access procedure with the second system, the multi-RAT mobile station transceives data with the second system. In this case, a connection with the second system, a cancellation of the connection with the second system, a connection change with the second system and the like correspond to an operation (or management) process of the second system. And, the first system controls the management of the second system.

In this case, in order for the multi-RAT mobile station to access the second system, the multi-RAT mobile station should receive a confirmation response for the access to the second system from the first system.

As mentioned in the foregoing description, the base station selects an AP for the multi-RAT mobile station to access before transmitting the multi-RAT mobile station the confirmation response for the access of the multi-RAT mobile station to the second system and then checks the status of the selected AP. Having checked the status of the AP, if it is feasible to access the selected AP, the base station may be able to transmit an information on the multi-RAT mobile station to the selected AP in advance.

And, in case that the base station transmits the confirmation response to the multi-RAT mobile station, necessary or useful information for the multi-RAT mobile station to access the AP can be transmitted together with the confirmation response.

For instance, the necessary or useful information may include a SSID, an MAC address of AP, a WEP key, a channel number (frequency information), a protocol version of the AP (11a/b/n . . . ), an offset information between beacon and a frame of the base station, i.e., transmitting a relative position of the beacon by representing the difference with a specific frame time, and the like.

Having performed an AP scanning for an access to the second system, if the multi-RAT mobile station recognized that the multi-RAT mobile station entered the coverage of the second system, the multi-RAT mobile station may make a request for the access to the second system to the base station of the first system.

Second System Management

In the following description, a method of operating (or managing) a second system is explained in detail. First of all, a second system management may mean a connection between the second system and a multi-RAT mobile station, a cancellation of the connection between the second system and a multi-RAT mobile station, or the connection change between the second system and a multi-RAT mobile station. The second system operation is controlled by a base station, i.e., a first system.

As one example of the method of operating the second system, a process for the multi-RAT mobile station to access (or connect) the second system, i.e., a process to simultaneously transceive data with the first system and the second system by adding the second system is explained.

Figure 5:
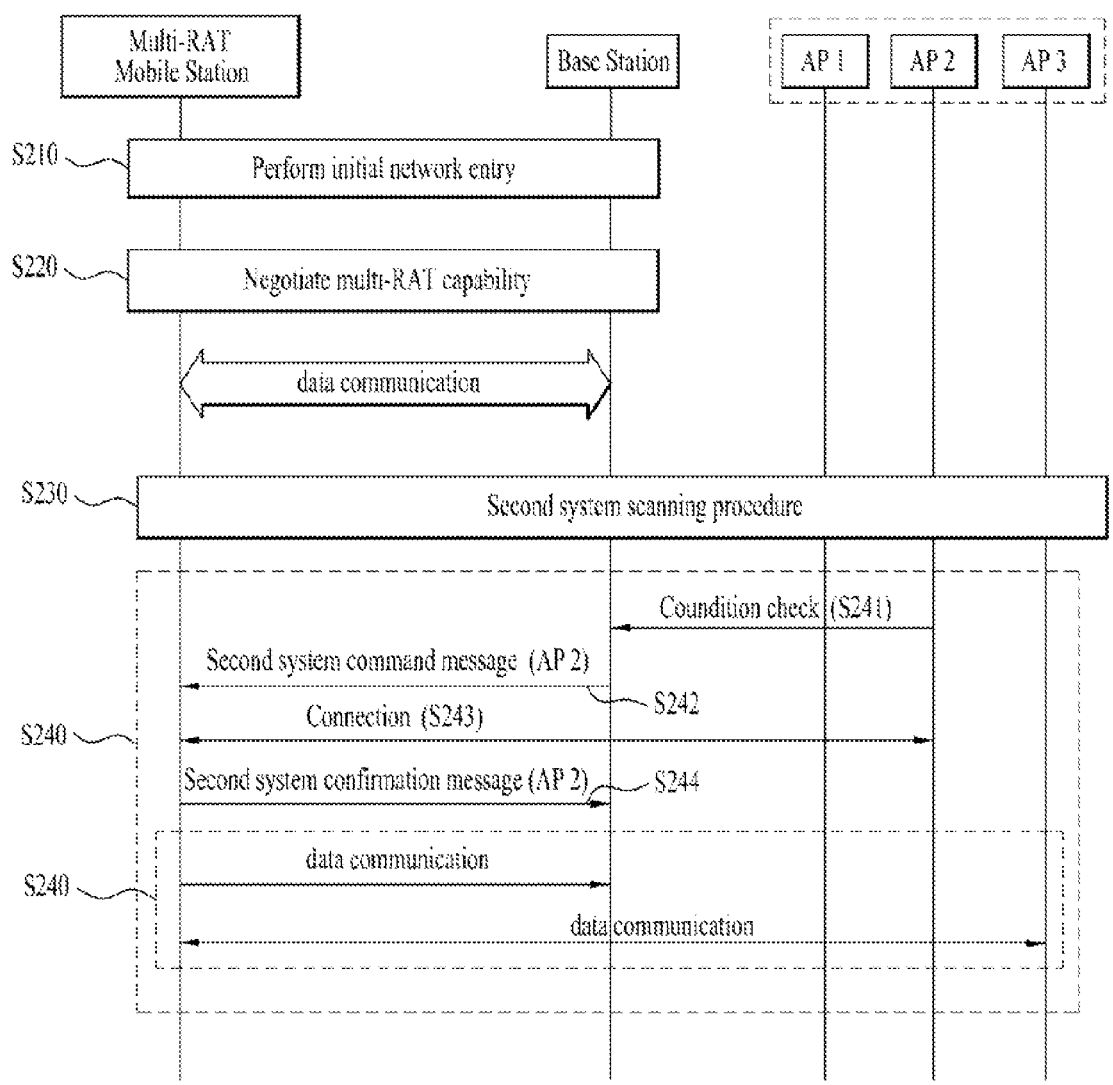
FIG. 5 is a flowchart for explaining a process of adding a second system, i.e., a process for a multi-RAT mobile station to access the second system among second system management methods according to one embodiment of the present specification.

FIG. 5 is a flowchart for explaining a process of adding a second system, i.e., a process for a multi-RAT mobile station to access the second system among second system management methods according to one embodiment of the present specification.

Since S210 to S230 are the same as the contents of FIG. 2, the explanations for the steps are omitted. The step of S240 having a difference is explained in detail.

The multi-RAT mobile station or the base station may be able to perform a multi-RAT access request for an access to the second system. In this case, the multi-RAT access request process may be performed via a second system access request/response message.

Regarding a case that the second system is added by a request of the multi-RAT mobile station, if the multi-RAT mobile station detected the second system satisfying a specific condition by performing a scan, the multi-RAT mobile station may be able to make a request for a connection to the second system to the base station by sending a second system request message.

Regarding a case that the second system is added by a request of the base station, if the base station detected that a specific flow connection is generated to the multi-RAT mobile station, the base station checks a status of an AP accessible by the multi-RAT mobile station (S241).

As a result of the check, if it is feasible to access the multi-RAT mobile station, the base station may be able to indicate a connection between the multi-RAT mobile station and the second system by sending a second system command message to the multi-RAT mobile station (S242).

In this case, a control for the multi-RAT mobile station to access a multi-RAT, i.e., transmitting a control information is performed by the base station of the first system. This makes the multi-RAT mobile station simply perform a data transmission/reception to/from the second system only and then enables a QoS for the corresponding data to exactly follow a scheme that the first system supports. In doing so, transmitting the control information may be performed by a second system access command message.

In this case, the second system access command message may include an information on a selected AP, a flow information transmitted to the second system, a scheme of authentication (open system or shared key) and the like. Referring to FIG. 5, the selected AP information corresponds to AP 2.

Thereafter, the multi-RAT mobile station finishes an access and a traffic stream (TS) configuration with a specific AP with reference to the AP information in a second system command message by the second system access command of the base station (S243). For instance, an ADDTS request/response process of 802.11e can be performed.

Thereafter, the multi-RAT mobile station informs the base station of a result of success in accessing the AP (S244).

Referring to FIG. 5, the multi-RAT mobile station informs the base station of the success in accessing the AP2.

In this case, it can be performed by a second system indication (SS_IND) message. The second system indication message may be able to include a mapped result of a FID (flow ID) and an AID (association ID)/TSID (traffic stream ID) for a corresponding flow.

Thereafter, the multi-RAT mobile station transmits/receives data for a specific flow via the second system. In particular, the multi-RAT mobile station simultaneously transceives data with the first system and the second system according to data flows (S240).

In particular, in case of DL data, the base station makes the DL data transmit to a multi-RAT mobile station via an AP.

In case of UL data, data transmission for a specific flow ID indicated by the base station is transmitted via a second system (e.g., WLAN).

And, the multi-RAT mobile station may be able to perform a re-establishment of a connection with an AP or a cancellation of the connection with the AP by transceiving a second system command/indication message with the base station.

While data is transceived with the AP by the multi RAT-mobile station, in case that the multi RAT-mobile station leaves the coverage of WLAN, which is one example of the second system, and there is no nearby AP, the base station may be able to control a seamless flow mobility between the AP and the base station to seamlessly transmit the data, which is currently transceived with the AP, via the base station of the first system.

And, while the multi-RAT mobile station transceives data with an AP of the second system, in case that the multi-RAT mobile station detected a neighbor AP, the base station may be able to control the data to be transceived seamlessly with the neighbor AP from the AP.

In the following description, a method of deleting (or canceling a connection with) the second system is explained.

If a multi-RAT mobile station determines that a channel status with the currently accessed second system is poor, the multi-RAT mobile station performs a scan for a nearby second system. In this case, the scan may be performed by an indication of the base station or the multi-RAT mobile station autonomously as mentioned in the foregoing description.

Having performed the scan for the nearby second system, if it is determined that there is no detected second system, the multi-RAT mobile station cancels the connection with the currently accessed second system.

In case that a data corresponding to a random flow of the first system is in the middle of being transceived via the second system and a mobile station is not able to make a handover to a nearby second system, the base station should support a multi-RAT seamless flow mobility to perform the seamless flow mobility without data loss for the corresponding flow.

Or, if transmission of data, which is transceived with the second system by the multi-RAT mobile station, is completed, the base station may be able to cancel the connection with the second system.

In the following description, a change of the second system (e.g., a handover to a nearby AP) is explained.

First of all, a change with the second system, i.e., a handover between the second systems may be assumed to be performed only for a specific connection.

In this case, the change of the second system may enable a handover to be performed seamlessly between the second systems via the first system.

If the multi-RAT mobile station or the base station determined that a channel status with the currently accessed second system is poor, the multi-RAT mobile station or the base station cancels the connection with the currently accessed second system and may be then able to make a request for a handover to a different second system.

In particular, the base station informs the multi-RAT mobile station that there is no more data transmission/reception via a current serving second system by sending a SS-CMD message to the multi-RAT mobile station. Thereafter, the base station instructs the multi-RAT mobile station to transceive an existing transmitted data via the first system. In case that the transmission of the existing data is completed, the base station instructs the multi-RAT mobile station to transceive data with a new second system. In particular, a seamless handover between the second systems can be performed by the first system.

And, when the multi-RAT mobile station performs a handover between the first systems, in case that the coverage of the second system extends into the boundary of the first systems, the multi-RAT mobile station may be able to perform a seamless handover between the first systems using the second system.

And, in case that the multi-RAT mobile station is moving with high speed in a coverage of the first system (e.g., WiMAX), the base station may be able to instructs the multi-RAT mobile station not to access the second system, although the multi-RAT mobile station entered the coverage of the second system. As mentioned in the above, the management of the second system can be performed based on the speed of the multi-RAT mobile station.

The embodiments and modified examples thereof mentioned in the foregoing description can be combined with one another. The embodiments can be implemented in a manner of being combined with one another rather than separately implemented if necessary. Since such combination can be easily implemented by those skilled in the art, its details shall not be further described. Yet, even if the combinations are not described, they shall not be excluded from the present invention and should be construed as coming within the scope of the appended claims and their equivalents.

Embodiments and the modified examples of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

For instance, a method according to the present invention can be stored in a storing device (e.g., a built-in memory, a flash memory, a hard disk, etc.) and can be implemented into codes and/or commands in a software program implementable by a processor (e.g., microprocessor). This is explained with reference to FIG. 6.

Figure 6:
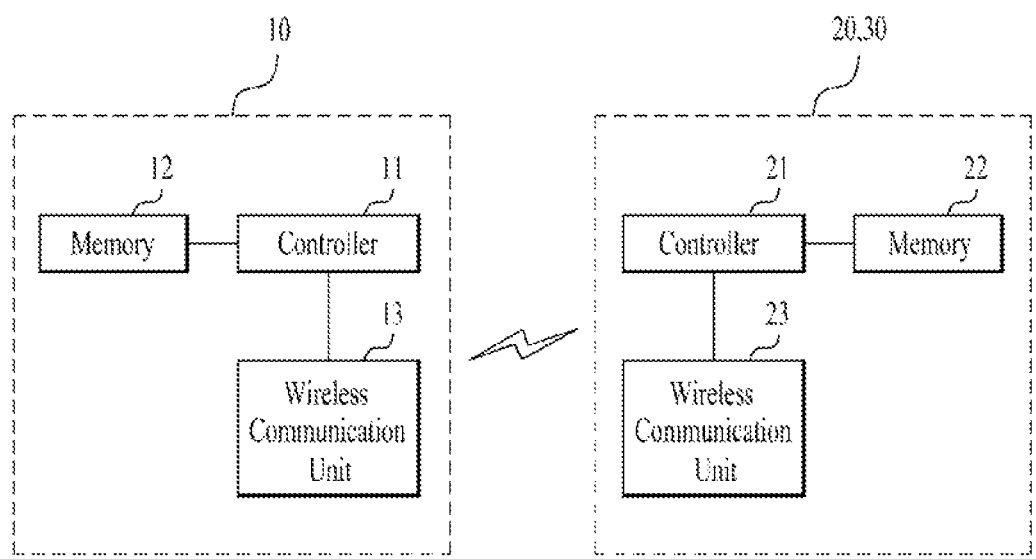
FIG. 6 is an internal block diagram of a mobile station and a base station in a wireless access system, to which one embodiment of the present specification can be applied.

FIG. 6 is an internal block diagram of a mobile station and a base station in a wireless access system, to which one embodiment of the present specification can be applied.

Referring to FIG. 6, a mobile station 10 may include a control unit 11, a memory 12, and a RF (radio communication) unit 13.

A mobile station 10 may be fixed or may have mobility. The mobile station can be called such a different terminology as a user equipment (UE), a user terminal (UT), a subscriber station (SS), a wireless device, an advanced mobile station (AMS) and the like. And, the mobile station may include the multi-RAT mobile station.

And, the mobile station may include a display unit, a user interface unit and the like.

A control unit 11 implements the proposed functions, processes and/or methods. Layers of a radio interface protocol can be implemented by the control unit 11.

A memory unit 12 is connected with a control unit 11 and then stores a protocol for performing a radio communication or a parameter. In particular, the memory unit stores a UE operation system, an application, and a general file.

A Wireless communication unit 13 is connected with the control unit 11 and then transmits and/or receives a radio signal.

Additionally, the display unit displays various kinds of information of a mobile station and can use such a well-known component as an LCD (liquid crystal display), an OLED (organic light emitting diode) and the like. A user interface unit can be configured in a manner of being combined with such a well-known user interface as a keypad, a touchscreen and the like.

The base station 20/30 may include a control unit 21, a memory 22, and a RF (radio communication) unit 23.

The base station means a fixed station communicating with a mobile station in general and may be substituted with such a terminology as a Node B, a base transceiver system (BTS), an access point (AP) and the like. One base station contains at least one cell.

The control unit 21 implements the proposed functions, processes and/or methods. Layers of a radio interface protocol can be implemented by the control unit 21.

The memory 22 is connected with the control unit 21 and then stores a protocol for performing a radio communication or a parameter.

A Wireless communication unit 23 is connected with a control unit 21 and then transmits and/or receives a radio signal.

The control unit 11/21 may include ASIC (application-specific integrated circuit), a different chip set, a logical circuit and/or a data processing device. The memory 12/22 may include ROM (read-only memory), RAM (random access memory), a flash memory, a memory card, a storing media and/or a different storing device. The Wireless communication unit 13/23 may include a base band circuit for processing a radio signal. The aforementioned scheme can be implemented by a module (process, function and the like) performing the above mentioned function when embodiments are implemented by software. The module is stored in the memory 12/22 and may be implemented by the control unit 11/21.

The memory 12/22 may be built-in or outside the control unit 11/21. And, the memory 202/212 may be connected with the control unit 11/21 via various kinds of well-known means.

The technical terminologies used in the present specification are used only to describe a specific embodiment(s) and have no intention to restrict the present invention. The technical terminologies used in the present specification should be construed not as excessively inclusive meanings or excessively reduced meanings but as meanings generally understood by those having ordinary skill in the technical field, to which the present invention pertains, unless defined as other meanings especially in the present specification. If the technical terminologies used in the present specification fail in correctly representing the idea of the present invention, they should be substituted with technical terminologies correctly understandably by those having ordinary skill in the technical field to which the present invention pertains. Moreover, general terminologies used by the present invention may be construed not as the excessively reduced meanings but as the meanings defined in dictionaries or the sequence of the context.

And, the singular number representation used in the present specification may include the plural number representation unless mentioned clearly and differently in context. In the present application, such a terminology as 'configured', 'include' and the like should be construed not as necessarily including various components or steps written in the present specification but as including the components or steps in part or further including additional components or steps.

Moreover, a terminology, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components. For instance, a $1^{st}$ component may be named a $2^{nd}$ component while coming within the scope of the appended claims and their equivalents. Similarly, the $2^{nd}$ component may be named the $1^{st}$ component.

In case that one component is mentioned as 'connected to' or 'accessing' another component, it may be connected to or access the corresponding component in direct. Yet, new component(s) may exist in between. On the other hand, in case that one component is mentioned as 'directly connected to' or 'directly accessing' another component, it should be understood that new component(s) may not exist in between.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

What is claimed is:

1. A method of transceiving data by a mobile station with a first base station supporting a first radio access technology and a second base station supporting a second radio access technology in a radio access system supporting a multi-radio access technology (RAT), the method comprising:

performing, by the mobile station, an initial network entry process with the first base station;

performing, by the mobile station, a multi-RAT capability negotiation process with the first base station to exchange information necessary for an additional access to the second base station;

performing, by the mobile station, a scanning procedure on at least one second base station included in a coverage of the first base station based on the exchanged information received from the first base station by the multi-RAT capability negotiation process;

performing, by the mobile station, an additional access procedure with a specific base station of the at least one second base station to simultaneously connect the mobile station to both the first base station and the specific base station; and if the additional access procedure with the specific base station is successful, simultaneously transmitting and receiving, by the mobile station, control information related to the RAT and data information to and from the first base station while simultaneously transmitting and receiving data information to and from the specific base station, wherein the performing the additional access procedure by the mobile station is based on a moving speed of the mobile station and includes:

if the moving speed of the mobile station is less than a predetermined value:

receiving, by the mobile station, a second system access command message indicating the access to the specific base station from the first base station, and accessing, by the mobile station, the specific base station based on the received second system access command message; and if the moving speed of the mobile station is equal to or more than the predetermined value:

receiving, by the mobile station, a message from the first base station instructing the mobile station not to access the specific base station.

2. The method of claim 1, wherein the performing the additional access procedure further includes making a request for the access to the specific base station to the first base station.

3. The method of claim 1, wherein the performing the additional access procedure further includes sending to the first base station a second system access indication message indicating whether the access to the specific base station is successful.

4. The method of claim 1, wherein the second system access command message comprises at least one of information on the second base station accessed by the mobile station, flow information transmitted to the accessed second base station, and information indicating a scheme of authentication between the mobile station and the second base station.

5. The method of claim 1, wherein while the data is transceived with the second base station, if a channel quality with the second base station is smaller than a pre-defined threshold value, the method further comprising the step of making a request for a release of connection with the second base station to the first base station.

6. The method of claim 5, further comprising:
releasing the connection with the second base station after transceiving data with the accessed second base station is completed.

7. The method of claim 1, wherein the first radio access technology comprises a wideband radio access technology and the second radio access technology comprises a short-range radio access technology.

8. The method of claim 1, wherein the first base station and the second base station are connected with each other by wire or wirelessly.

9. The method of claim 1, wherein a type of data flow transceived via the second base station is determined by an indication of the first base station.

10. A mobile station configured to transceive data with a first base station supporting a first radio access technology and a second base station supporting a second radio access technology in a radio access system supporting a multi-radio access technology (RAT), the mobile station comprising:

a wireless communication unit configured to transceive a wireless signal with an external device; and a control unit connected to the wireless communication unit and configured to control the wireless communication unit to:

perform an initial network entry process with the first base station, perform a multi-RAT capability negotiation process with the first base station to exchange information necessary for an additional access to the second base station, perform a scanning process for at least one second base station included in a coverage of the first base station based on the exchanged information received from the first base station via the multi-RAT capability negotiation process, perform an additional access procedure with a specific base station of the at least one second base station to simultaneously connect the mobile station to both the first base station and the specific base station; and if the additional access procedure with the specific base station is successful, simultaneously transmit and receive control information related to the RAT and data information to and from the first base station while simultaneously transmitting and receiving data information to and from the specific base station only, wherein the additional access procedure is performed, by the control unit, based on a moving speed of the mobile station and includes:

if the moving speed of the mobile station is less than a predetermined value:

receiving, by the control unit, a second system access command message indicating the access to the specific base station from the first base station, and accessing, by the control unit, the specific base station based on the received second system access command message; and if the moving speed of the mobile station is equal to or more than the predetermined value:

receiving, by the control unit from the first base station, a message instructing the mobile station not to access the specific base station.

* * * * *